Figure 1:
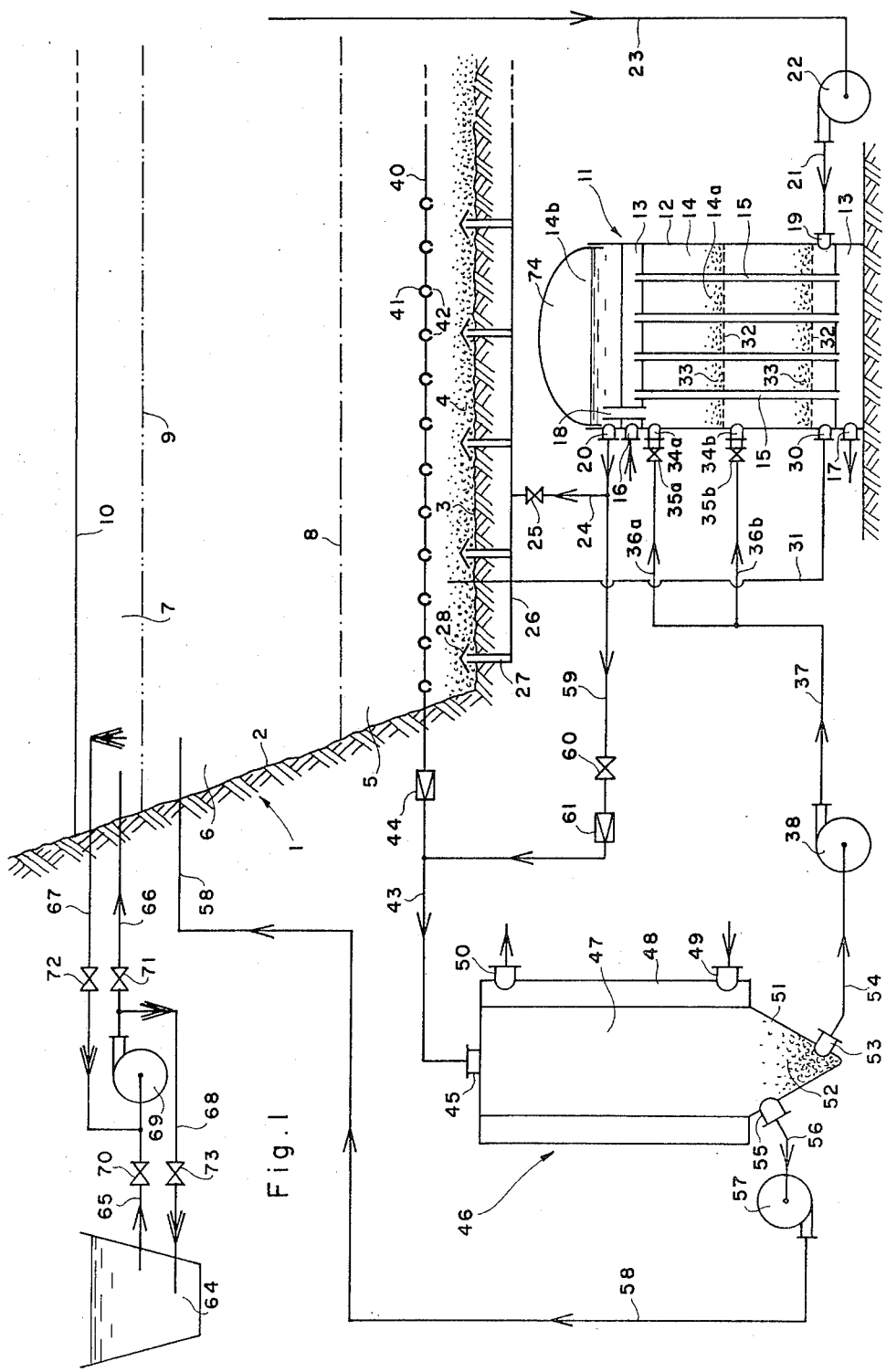

United States Patent [19]

Wirguin et al.

[11] 4,328,788

[45] May 11, 1982

[54] HEAT STORAGE IN A POND CONTAINING A SATURATED AQUEOUS SALINE SOLUTION

[76] Inventors: Joseph M. Wirguin, 40 King George St., Jerusalem; Avraham Melamed, 31 Haoranim St., Kfar Shmaryahu, both of Israel

[21] Appl. No.: 241,886

[22] Filed: Mar. 9, 1981

Related U.S. Application Data

[63] Continuation of Ser. No. 31,107, Apr. 18, 1979, abandoned.

[30] Foreign Application Priority Data

Apr. 30, 1978 [IL] Israel ......................................... 54597

[51] Int. Cl.³ ........................... F24J 3/02; F28D 13/00
[52] U.S. Cl. ...................................... 126/415; 126/400; 165/1; 165/104.31
[58] Field of Search ............... 126/400, 415, 416, 430, 126/436, 437; 165/104 S, 18, 45; 23/298; 159/15

[56] References Cited

U.S. PATENT DOCUMENTS

| | | | |
|---|---|---|---|
| 3,105,137 | 9/1963 | Sullivan et al. | 126/400 |
| 3,958,101 | 5/1976 | Barabas | 126/400 |
| 3,997,001 | 12/1976 | Chubb | 126/400 |
| 4,008,758 | 2/1977 | Chubb | 126/400 |
| 4,031,952 | 6/1977 | Contour et al. | 165/104 S |
| 4,071,079 | 1/1978 | Englebrecht | 165/104 S |
| 4,109,702 | 8/1978 | Greene | 165/104 S |
| 4,119,556 | 10/1978 | Chubb | 126/400 |
| 4,153,047 | 5/1979 | Dumbeck | 126/400 |
| 4,158,384 | 6/1979 | Brautigam | 126/400 |
| 4,187,904 | 2/1980 | Kuhnlein | 165/104 S |

FOREIGN PATENT DOCUMENTS

| | | | |
|---|---|---|---|
| 12561 | 11/1960 | Israel | 126/400 |
| 19922 | 9/1963 | Israel | 126/400 |

OTHER PUBLICATIONS

Assaf, The Dead Sea: A Scheme for a Solar Lake, 1976, Solar Energy, vol. II, pp. 293-299.

Primary Examiner—Daniel J. O'Connor
Attorney, Agent, or Firm—Ladas & Parry

[57] ABSTRACT

Installation and method for the storage of thermal energy and its supply when required. The thermal energy may be solar or be derived from industry. For storage a pond is used which holds an aqueous saline solution whose concentration and temperature decreases from bottom to top and which is saturated at each level at the temperature there prevailing. Solid solute is provided at the bottom of the pond. Heat extraction is effected from solution at the bottom region and may be effected by heat exchange within the pond or by withdrawal of solution from near the bottom of the pond subjecting the withdrawn solution to heat exchange outside the pond and returning the solution and precipitated solute to the pond.

43 Claims, 2 Drawing Figures

HEAT STORAGE IN A POND CONTAINING A SATURATED AQUEOUS SALINE SOLUTION

This is a continuation, of application Ser. No. 031,107 filed Apr. 18, 1979, now abandoned.

The present invention concerns broadly the storage of heat in aqueous solutions and its recovery therefrom when required. An aqueous solution used in accordance with the invention is contained within a pond such as a natural cavity or an excavated depression of the soil. The concentration, density and temperature of such a solution decreases from bottom to top and a pond containing such a solution will be referred to hereinafter as "thermal pond".

The property of a thermal pond that its temperature decreases from bottom to top will be referred to hereinafter as "inverse temperature gradient". The term "level" when used in the following in relation to a region within a thermal pond, signifies a vertical distance from the bottom, "low level" signifying closer to the bottom and "high level" closer to the surface.

Where in the following specification and claims reference is had to the storage of heat, this is meant to include also heat stored in a solution in consequence of its being heated to above ambient temperature and being maintained at said temperature, e.g. by solar radiation.

In accordance with the invention the heat stored in a thermal pond may be derived from various heat donor sources. Thus, for example, the invention contemplates to store heat from industrial sources, e.g. heat contained in steam bled from turbines or engines, waste heat from internal combustion engines, industrial furnaces, from geothermal sources, and the like. In many cases there is a time lag between the availability of heat from such sources and the consumers' requirements. This time lag is exemplified in its extreme by the necessity to store waste heat available in summer for domestic heating in winter. The present invention aims at fulfilling such tasks.

There are also cases where although heat supply and demand coincide in time, one exceeds the other. Consequently, where the supply exceeds the demand the excessive available heat has to be stored; and where the demand exceeds the supply the excessive demand has to be met by drawing on stored heat. The invention also aims at solving these problems.

The invention further contemplates capturing solar radiation, its conversion to heat and storage of the latter.

In connection with the capture and storage of solar energy, a particular type of thermal pond, the so-called solar pond is known from the literature. For example, Israel Patent Specification No. 12561, describes a solar pond which contains an aqueous solution the concentration and density of which decreases from bottom to top. The bottom of the pond absorbs solar radiation and converts it into heat, whereby the layer of solution in contact therewith is heated. Because of the concentration gradient, accompanied by an inverse temperature gradient, the occurrence of convective currents is prevented. In this manner solar radiation is absorbed and converted into heat and the latter is stored. A specific example disclosed in said patent specification concerns a solar pond one meter deep containing a magnesium chloride solution the concentration and temperature of which gradually drop from 300 g/l and 60° C. at the bottom to 10 g/l and 20° C. at the top.

In such known solar ponds there exists an inevitable diffusion of salt from bottom to top and in the particular example disclosed in Israel Patent Specification No. 12561 the rate at which the salt passes to the top is about 40 g per day per $m^2$. In view of this, for the maintenance of the desired concentration gradient, it is necessary to feed extraneous salt to the bottom of the pond, intermittently or continuously, and at the same time to flush fresh water or a dilute solution across the surface region of the pond, again intermittently or continuously. The addition of salt to the bottom of the pond serves to make up the salt that diffuses upwards and the flow of fresh water or dilute solution across the surface serves to wash away the salt arriving from below by diffusion as otherwise there would be a gradual build-up of concentration at the top regions resulting eventually in destruction of the inverse concentration gradient and a state of uniform concentration throughout the pond.

Israel Patent Specification No. 19922 discloses an alternative method for maintaining the desired concentration gradient in a solar pond. In accordance with that method, occasionally referred to in the literature as the "falling pond" or "sinking pond" method, some hot solution is withdrawn continuously or intermittently from the bottom region and subjected to flash evaporation. The remaining, more concentrated solution which is of reduced volume is returned to the bottom region and the body of solution inside the pond sinks by an amount which corresponds to the difference in the volumes of the withdrawn and recycled solutions. Fresh water or a dilute solution is added to the top of the pond to compensate for the dropping or sinking of the body of solution, in order to keep the level constant. The rate of dropping or sinking of the pond is adjusted so as to counteract the upward migration of the solute in consequence of diffusion and in this way the desired concentration gradient inside the pond is maintained.

It has turned out that the proper adjustment of the rate of "falling" of such a pond so as to counteract the rate of upward diffusion of the solute and thereby to maintain the desired concentration gradient substantially constant, is difficult to achieve in practice. This method has thus not been applied commercially.

A further proposal for a solar pond was published by Gad Assaf in Solar Energy, Vol. 18, pages 293–299, Pergamon Press, 1976. According to this proposal the deep water basin of the Dead Sea in Israel is to be converted into a solar pond. For this purpose it is proposed to build up the desired inverse temperature gradient in the top region of the lake down to a depth of about 1.5 m. and to utilize the body of solution underneath, which at places may be as deep as 400 m. for thermal insulation against the bottom and to avoid any bubbling of gases and steam through the bottom which might happen if the hot layer were at the bottom of the pond itself. In accordance with this proposal the operational part of the solar pond functions as in accordance with Israel Pat. No. 12561 referred to above.

Plans are also known to store in sweet water lakes heat tapped from steam turbines. In such arrangements the heat stored in the lake is transported to the surface thereof by thermal convection and conduction and, consequently, insulation against the atmosphere is required.

In all these known techniques the storage temperature does not exceed about 100° C. and will as a rule have to be somewhat below this temperature so as to avoid boiling and, in case of solar ponds, disintegration of the layered structure of the pond and a resulting interruption of operation.

It is an object of the present invention to provide heat storage installations on the basis of thermal ponds in which the storage temperature does exceed 100° C. and which do not require the addition of any solution or solute except for making up operational losses that are inevitable in industrial operations. It is a further object of the invention to provide such installations adapted for capturing and storing solar energy as well as such that are suitable for the storage of thermal energy from other sources.

The invention is based on the realisation that upward diffusion of solutes in a thermal pond and the need for extraneous make-up can be avoided if the aqueous solution is always saturated and a solute is used whose solubility increases with temperature. Because of the inverse temperature gradient, the solution at each level of the pond is saturated at the temperature there prevailing, and no diffusion of the solute is possible. Since a saturated solution cannot dissolve an additional quantity of solute, any solute penetrating into a saturated, overlaying, cooler solution layer must precipitate and the precipitated crystals will drop back into the hotter, underlying solution layer where they will be redissolved.

Based on the above, the invention provides an installation for the storage and supply of heat comprising a thermal pond for heat storage holding a body of an aqueous solution of a solute the water solubility of which increases with temperature, the concentration, density and temperature of said solution decreasing towards the top, characterized by:

(a) said solution being saturated at each level at the temperature there prevailing;
(b) solid solute being present permanently on the bottom of the pond in contact with said solution; and
(c) heat extractor means being provided for heat transfer from hot solution available at a low-level region of the pond to a heat-acceptor fluid thereby to cool said solution and bring about the precipitation of solute therefrom.

The fact that in accordance with the invention the solution in the thermal pond is saturated at each level at the temperature there prevailing accounts for higher storage temperatures achieved. Thus, in an installation according to the invention for capturing solar radiation and converting it into heat—to be referred to hereinafter as "solar installation"—in which the thermal pond is necessarily shallow, the storage temperature in case of calcium chloride as solute may be of the order of 170° C. In an installation according to the invention for the storage of heat from a heat donor source—to be referred to hereinafter as "storage installation"—the thermal pond will be deeper, e.g. about 20 meters and the storage temperature is raised by the combined effect of saturation and hydrostatic pressure and may exceed 200° C.

By means of said heat-acceptor fluid heat is supplied from the installation to the consumer. The heat extractor means may be within or outside the pond. In either case withdrawal of heat cools the solution which thereby becomes over-saturated with the consequence that solid solute precipitates therefrom.

Heat extractor means within the pond may, for example, be in the form of a conventional indirect heat exchanger located near the bottom. The solute that precipitates in consequence of the heat withdrawal accumulates in such a case at the bottom of the pond where it is available for re-dissolution upon heat input.

Where said heat extractor means are located outside the pond the installation comprises means for the withdrawal of hot solution from a low-level region of the pond to said heat extractor means and means for returning the withdrawn, cooled solution and precipitated solute to the pond. The cooled solution and precipitated solute may be returned to the pond together as a slurry or separately. The cooled solution or slurry, as the case may be, is preferably injected into the pond at a level where the density is the same. This is particularly desirable in case of a relatively deep thermal pond.

If desired, separated solid solute may be stored temporarily outside the pond for subsequent use in a heat input operation. Also if desired at least some of the returned solid solute may be spread on the surface of the pond. The so-recycled solute sinks through the solution and in this way part of it is dissolved and saturation is maintained at all levels. Any excess of the sinking solute that is not dissolved collects at the bottom of the pond and replenishes the bottom layer with solid solute.

The solid solute provided on the bottom of the pond has a buffer-like function and ensures that the solution within the pond remains always saturated.

In a solar installation according to the invention said body of aqueous solution is sufficiently shallow to enable the penetration of visible solar radiation to the bottom of the pond. In such an installation all the heat input into the thermal pond is derived from the sun and during solar irradiation some of the solid solute present on the bottom of the pond is dissolved. Where in such an installation heat withdrawal occurs outside the pond the returned solute is preferably spread on the pond surface.

In a solar installation the heat obtained from the captured solar radiation may be used as it forms or be stored, as may be required.

In a storage installation according to the invention heat input is by heat exchange with a heat donor fluid and such an installation thus comprises means for such a heat exchange. In one embodiment of a storage installation according to the invention heat input means are located within the pond, e.g. in form of a heat exchanger installed near the bottom of the pond. As the heat donor fluid passes through the exchanger heat is transferred to a solution in the pond and in consequence some of the solid solute on the bottom is dissolved.

In accordance with another embodiment of a storage installation according to the invention heat input means are located outside the pond. Such an embodiment comprises means for the withdrawal of solution from a high level in the pond, heat exchanger means outside the pond for heating said withdrawn solution by heat exchange with a heat donor fluid, means for saturating the so-heated solution with solute and means for injecting the so-produced hot, saturated feed solution into the bottom region of the pond.

In order to ensure that the feed solution is completely saturated at the temperature of injection it is preferably made to percolate through the solid solute present on the bottom of the pond.

Where in such an embodiment heat withdrawal is also effected by heat exchange outside the pond the solid solute required for preparing said hot, saturated feed solution is supplied from the heat withdrawal operation, if desired after temporary storage. Such an embodiment thus comprises means for transferring solute precipitated during heat withdrawal to said means for temporary storage of precipitated solute may be provided.

Where, on the other hand, in such an embodiment heat withdrawal is effected by heat exchange within the pond, means are provided for withdrawing from the bottom region of the pond the solid solute required for preparing said hot saturated feed solution.

In accordance with the invention there may be provided a combined solar-storage installation. In such an installation the body of solution in the thermal pond is sufficiently shallow to enable the penetration of visible solar radiation to the bottom of the pond, and in addition means are provided for the heat input by heat exchange with a heat donor fluid inside or outside the pond, as specified hereinbefore.

In a storage or combined solar-storage installation according to the invention heat input and heat withdrawal may occur consecutively or simultaneously according to need.

In any solar, storage or solar-storage installation according to the invention the solute moves in a closed cycle between a solid phase and a solution and remains within the installation throughout the entire operation. Likewise, where heat exchange for heat input and/or heat withdrawal occurs outside the thermal pond any solution withdrawn from the pond is returned thereto and thus also moves in a closed cycle. In this way no make-up solution and solute are required, short of making up for operational losses which are inevitable in industrial processes.

It is seen from the above that in accordance with the invention, heat input is accompanied by dissolution of solute and heat withdrawal by precipitation of solute.

The heat storage capacity of a thermal pond in an installation according to the invention increases with the depth of the pond. As mentioned in a solar or solar-storage installation according to the invention the depth is limited by the requirement that solar radiation has to penetrate to the bottom of the pond. This limitation however does not exist in case of a storage installation in accordance with the invention and in such a case the depth of the pond is selected in accordance with the desired heat storage capacity and other requirements.

The storage temperature at the bottom region of the pond depends on the temperature of the heat donor fluid and the pond design. Obviously the highest storage temperature may not exceed the temperature of the donor fluid, but it may be lower.

Depending on the depth of the thermal pond in a storage installation, the nature of the solute and the temperature of the heat donor fluid, the heat input into the pond may give rise to the formation and expansion of a zone of essentially uniform temperature, concentration and density which will be referred to hereinafter as "isothermal zone". The formation of an isothermal zone is due to the following:

Heating of a solution in general causes its thermal expansion and in consequence a reduction of its density. In accordance with the invention, heating due to heat input into the pond is accompanied by dissolution of solute and this in turn leads to an increase of density. There may thus occur in the bottom region two competing processes—one giving rise to an increase and the other to a decrease of the density. Provided the pool is sufficiently deep and the hydrostatic pressure on the interface between the isothermal and insulating zones is sufficiently high to prevent boiling, and further provided that the temperature of the donor fluid is sufficiently high, it is possible to heat the solution in the bottom region to a temperature where the reduction of density due to thermal expansion and the increase of density due to an increase of concentration in consequence of further dissolution, cancel out each other. In other words, for some solutes and above a certain minimum hydrostatic pressure which can readily be established for each such solute, there exists for each hydrostatic pressure a temperature to be referred to hereinafter as "equilibrium temperature" at which the above two phenomena are in equilibrium with each other. At the equilibrium temperature the density of the solution in the isothermal zone is at its maximum and on further heating of the solution above this temperature the thermal expansion will predominate and the density will drop. In consequence, the heated solution at a lower level will convect upwardly and mix with the overlying cooler solution whereby the latter is brought to the equilibrium temperature, with the result that the volume of isothermal zone increases. Thus, once the equilibrium temperature is reached, this temperature is maintained by self-adjustment, any further heat input resulting in expansion of the isothermal zone. Where, for example, the solute is $CaCl_2$, for attainment of an equilibrium temperature the hydrostatic pressure at the interface between the isothermal zone and the overlying solution should be of the order of 2 atm. abs. which requires that said overlying solution should be about 8 m. deep.

Thus, in accordance with one embodiment of a storage installation according to the invention, said body of aqueous solution comprises a lower, isothermal zone (as herein defined) and an upper zone superimposed thereon (hereinafter "insulating zone"), the insulating zone being sufficiently high such that the hydrostatic pressure at the interface between the isothermal and insulating zones is at least the minimum pressure required for reaching an equilibrium temperature (as herein defined) within the isothermal zone.

In such an embodiment the isothermal zone serves for heat input and withdrawal and the temperature of the heat donor fluid must be at least equal to the equilibrium temperature, failing which no isothermal zone will form. Heat input and/or heat withdrawal may each be effected by heat exchange either within or outside the pond, as specified.

In an installation according to the invention visible solar radiation penetrating into the body of the saturated solution in the thermal pond is gradually absorbed on its path therethrough and absorption is completed either at the bottom of the pond in case of a solar or solar-storage installation or somewhere in the body of solution in case of a storage installation. The solution in the pond is thus directly heated by the sun and may become unsaturated at places which in turn may give rise to the occurrence of convective currents and diffusion of solute. Where heat withdrawal is outside the pond and the precipitated solid solute is recycled by spreading on the surface thereof, any such deviation are self-regulated by recycled solid solute sinking through the solution from above as specified. However, where in a storage installation according to the invention all the solute precipitated in the heat withdrawal process is stored for recycling in form of a hot, saturated solution into the bottom region of the pond, no such self-regulation occurs. Therefore, also in such an installation it may in some cases be preferred to spread particulate solid solute or a slurry of solid solute in a saturated solution on the surface of the thermal pond during the period of solar irradiation so as to ensure a permanent saturation of the entire pond content, and thereby to obviate the above difficulties. If the thermal pond cools during the night and solute precipitates from the saturated solution therein, the precipitated solute will accumulate on the bottom of the pond. If during the next day there is no heat recuperation and thus no solid solute becomes available outside the pond, it is possible in accordance with such an embodiment to withdraw from the bottom of the pond the amount of slurry required for spreading on the surface.

In consequence of the direct heating of the thermal pond in an installation according to the invention by the sun as specified above, and in particular in consequence of the absorption of infrared radiation by a very thin top layer adjacent to the atmosphere, the solution exposed thereto will become undersaturated and will readily dissolve the particulate solid solute spread on the surface and sinking in the pond as specified whereby saturation is re-established. In consequence a heavy warm solution layer overlays a lighter, cooler one which gives rise to a downward convective flow of heated solution. This effect, which is common to solar and storage installations according to the invention, reduces losses of energy (heat) and matter (water) to the atmosphere.

In a storage installation according to the invention fluctuations of the hydrostatic pressure on the bottom of the pond may occur in consequence of heat input and heat withdrawal. Thus whenever heat input exceeds heat withdrawal the amount of dissolved solute in the pond increases at the expense of stored solid solute derived from heat withdrawal. Conversely, when heat withdrawal exceeds heat input the amount of solute dissolved in the pond decreases while the amount of stored solid solute increases. The weight of the solute dissolved inside the thermal pond thus fluctuates between a maximum when the storage capacity of the pond is fully utilized and a minimum when the heat content of the pond has been "emptied", the difference between the two extremes of solute content being stored for future re-charging. Consequently, the hydrostatic pressure on the bottom of the pond will also fluctuate between two limits. A drop in hydrostatic pressure may cause reduction of the boiling point to a point where the saturated solution in the hottest zone near the bottom begins to boil. The resulting steam will condense as soon as the bubbles reach a cooler level in the body of solution, diluting the saturated solution therein and by all this the thermal pond may be upset. The diluting effect is counteracted by the spreading of particulate solute or a slurry of solute on the surface of the pond, as specified, since by gradual dissolution of the sinking solute saturation of the solution in the pond is automatically restored whenever this is required. However, this does not prevent the bubbling effect of boiling which may cause some mixing and thereby upset the pond. It is thus of advantage to prevent altogether the boiling of the solution in the isothermal zone.

For this purpose in accordance with one embodiment of a storage installation according to the invention, an additional zone, hereinafter referred to as "pressure regulating zone", is set up on top of the body of solution, consisting of a saturated solution at ambient temperature containing the same solute as the remaining solution in the pond. Whenever the hydrostatic pressure at the bottom of the pond drops, solution is pumped into the pressure regulating zone from a reservoir or container to compensate the drop of hydrostatic pressure and whenever the hydrostatic pressure at the bottom rises, solution is pumped out of the pressure regulating zone back into said reservoir or container. The pressure regulating zone is thus gradually built up whenever heat withdrawal exceeds heat input and is gradually reduced whenever heat input exceeds heat withdrawal, the rate of build-up and reduction being so controlled that the hydrostatic pressure at the bottom of the pond remains essentially constant.

A pressure regulating zone may be required in storage installations according to the invention irrespective of whether the thermal pond does or does not comprise an isothermal zone. It may also be embodied in a solar installation according to the invention although in such installations the problem is less acute and boiling at the bottom can simply be avoided by so regulating heat withdrawal that the heat storage temperature at the bottom always remains below the boiling point of the saturated solution under the hydrostatic pressure there prevailing.

In a storage installation according to the invention heat input during the hot season will as a rule exceed heat withdrawal and conversely heat withdrawal during the cold season will as a rule exceed heat input; and there may be times of zero input and zero withdrawal. In case of a solar installation heat input during the daytime exceeds as a rule heat withdrawal while at night any operation will be by withdrawal only.

It may happen that the heat supplied from a donor source is simultaneous with the demand. In such cases the thermal pond may be by-passed and hot solution from heat input means located outside the thermal pond may be partly or totally charged directly to the heat extractor means also located outside the pond. To this end a storage installation according to the invention in which both the heat input and heat extractor means are located outside the pond, may comprise by-pass means for optional direct communication between the heat input and heat extractor means.

There is no critical limitation on the nature of the solute to be used in the construction of a thermal pond for an installation according to the invention other than that its solubility must increase with the temperature. However, as a rule such solutes will be preferred the aqueous solutions of which have a low vapour pressure, since by this the dissipation of heat to the atmosphere by evaporation is reduced. An example of such a preferred solute is calcium chloride-$CaCl_2$. Where a storage installation according to the invention serves for capturing and storing heat from a steam power plant, an additional benefit may be achieved by using the thermal pond as a cooling pond for the coolant of the plant condenser. The coolant may be made to flow across the pond, entering at about 40° C. and leaving at about 30° C., and as its specific gravity is lower than that of the uppermost saturated solution layer it will not penetrate therethrough. Consequently, the sensible heat of the cooling water is given off mainly to the atmosphere whereby the hot coolant is cooled, the coolant flowing across the thermal pond serving at the same time as an additional heat barrier improving the heat efficiency of the pond. In this way conventional expensive cooling towers can be dispensed with.

In practising this particular embodiment of the invention it is, from the standpoint of the thermal pond, preferable to use a saturated solution of solute as the condenser coolant. In this way flushing the coolant across the surface of the pond does not produce any detrimental effect. If, however, potable water is to be used as the condenser coolant, it may be preferable to interpose an impermeable sheet, e.g. of plastic material, between the pond surface and the condenser cooling water flushed across the surface thereof and any upsetting of the pond in consequence of such flushing is thereby avoided. The sheet is preferably of such a material which within reasonable limits will not impair the penetration of solar radiation therethrough into the pond.

The impermeable sheet is best floated on the surface of the thermal pond and to this end its apparent specific gravity should be lower than that of the top layer of the pond and higher than that of the cooling water.

Where the above is practised and at the same time it is desirable to spread a slurry of solid solute on the surface of the pond for recycling, special means have to be provided. For example, the sheets may have a plurality of perforated pockets depending therefrom which are fed with solute slurry and from which slurry flows gradually into the pond; or an array of perforated feed pipes may extend across the thermal pond underneath the floating sheet.

If the sub-soil on which the thermal pond of an installation according to the invention is built has faults, fissures, crevices, porosities or is generally water-permeable, some saturated solution penetrates into these hollows, cools off and salt crystallizes therein whereby the bottom of the pond is sealed.

A thermal pond for a solar or solar-storage installation according to the present invention can be set up as follows. In a suitable cavity, e.g. in a drained-off lake or in an artificial excavation the walls and bottom are treated so as to preclude brine infiltration into the sub-soil.

If necessary, a heat resistant plastic film is spread over the walls and bottom. Assuming that $CaCl_2$ is the solute to be used, a saturated solution of this salt is heated at atmospheric pressure to somewhat below its boiling point, say 170° C. This hot saturated brine is pumped into the prepared cavity. At the surface the pond will dissipate heat to the atmosphere and this cooling of the pond contents will propagate itself gradually downwards by conduction but not by convection, until a steady state is reached. At the same time the impinging solar radiation will heat the bottom so that the temperature there is maintained. By these two effects the solution in the pond cools off in a graduated manner and a steady state is spontaneously reached in which the pond has acquired the desired concentration, density and temperature gradients. At this time the pond is ready for use. During the graduated cooling, solute precipitates and accumulates at the bottom.

A thermal pond for a storage installation according to the invention may be set up in a similar way. However, the temperature of the saturated solution fed into the cavity is gradually raised from initially 170° C. (in case of $CaCl_2$) to the desired storage temperature, at the same pace as the hydrostatic pressure (depth) on the bottom of the storage pond is built up from the initial atmospheric pressure to that of the full pond.

By an alternative method a thermal pond for a solar or a solar-storage installation according to the invention is set up by first nearly filling the pond with a saturated solution at ambient temperature and then injecting into the bottom region of the pond a saturated solution heated close to the boiling point at the pressure prevailing at the bottom of the pond, e.g. 170° C. or even higher. By the combined action of the impinging solar radiation and the dissipation of heat to the atmosphere the required concentration, density and temperature gradients are established after some time whereupon the pond has reached steady state and is ready for use.

As mentioned, in an installation embodying thermal pond according to the invention the concentration and density of the solution decreases continuously from bottom to top, or alternatively from the interface between the isothermal and insulating zones where the pond comprises an isothermal zone. However, in practice allowance must be made for the influence of atmospheric precipitations (rain, snow, dew) which may dilute the upper levels of the thermal pond. This may have the consequence that the continuous concentration and density gradients may stop short of the surface of the pond, with the formation of a relatively thin unsaturated upper layer. This, however, does not detract from the general principles of the present invention.

The invention also provides a method of heat storage and supply wherein a thermal pond is set up holding a body of an aqueous solution of a solute whose water solubility increases with temperature, the concentration, density and temperature of said solution decreasing towards the top, said solution being saturated at each level at the temperature there prevailing; solid solute is provided on the bottom of the said thermal pond; said thermal pond is subjected to conditions at which the bottom region of said body of solution stores heat; and heat is withdrawn from said bottom region.

By one embodiment of the above method heat withdrawal from the bottom region is effected by heat exchange within the pond.

By another embodiment heat withdrawal is effected by withdrawing hot solution from the bottom region of the pond, subjecting it outside the pond to heat exchange with a heat-acceptor fluid whereby the withdrawn solution is cooled and some solid solute precipitates therefrom, and the so-cooled solution and precipitated solute are returned to the pond.

Where the above method is practised for the storage of heat from a donor source the heat input into the pond comprises heat exchange with the heat donor fluid. By one embodiment such heat exchange occurs within the pond in the bottom region thereof.

By another embodiment solution is withdrawn from an upper level of the pond, is subjected outside the pond to heat exchange with the said heat donor fluid, the so-heated solution is saturated with solid solute derived from the pond and the so-produced hot, saturated solution is injected into the bottom region of the pond.

Where in accordance with the above embodiment head withdrawal also occurs outside the pond the solute required for the preparation of said hot, saturated solution outside the pond is available from said heat withdrawal process. If, however, heat withdrawal occurs by heat exchange within the pond the solid solute required for establishing said hot, saturated solution in a heat input process is withdrawn from the bottom of the pond.

In particular embodiment of a heat storage method according to the invention serving for the storage of heat from a heat donor source a thermal pond is set up which is sufficiently deep to create in the bottom region a hydrostatic pressure sufficiently high to enable heating the solution in the bottom region up to an equilibrium temperature (as herein defined) thereby to form an isothermal zone (as herein defined); a hot saturated aqueous solution of said solute the temperature of which is at least equal to said equilibrium temperature is prepared outside the pond by withdrawing solution from said insulating zone (as herein defined), subjecting the withdrawn solution outside the pond to heat exchange with a heat donor fluid the temperature of which is at least equal to the equilibrium temperature and dissolving in it to saturation solid solute derived from the pond; and said hot saturated solution is injected into the bottom region of the pond whereby an isothermal zone is formed and an existing isothermal zone is expanded.

Where in a method according to the invention heat withdrawal occurs by heat exchange outside the pond at least some of the solid solutes that precipitate during the heat withdrawal process may be returned to the pond by spraying on the surface thereof.

By one embodiment of a method according to the invention serving for the storage of heat from a donor source, an aqueous solution of solute at ambient temperature is added at the top of the pond when heat withdrawal from the pond exceeds input and the so-added solution is withdrawn when heat input exceeds withdrawal, the addition and withdrawal of said solution being so controlled that the hydrostatic pressure at the bottom of the pond remains substantially constant.

Where the method according to the invention serves for the storage of heat from a steam power plant, it is possible, if desired, to flush the condenser coolant across the pond surface. Where the coolant is potable water it may be desirable to interpose an impermeable sheet between the pond surface and the flushed condenser water which sheet is preferably of such a material which within reasonable limits will not impair the penetration of solar radiation therethrough into the pond.

Where the method according to the invention serves for capturing solar radiation and converting it into heat, the thermal pond that is set up is sufficiently shallow to enable the penetration of visible solar radiation to the bottom of the pond.

The method according to the invention may be employed for the capture of solar radiation and its conversion into heat in combination with the storage of heat from a donor source. Heat withdrawal and heat input in such a case may be by any one of the ways specified above.

Where in such a method heat withdrawal occurs by heat exchange outside the pond the cooled solution and precipitated solid solute are preferably returned in form of a slurry which is spread on the surface of the pond.

In practising the method according to the invention one of the preferred solutes is calcium chloride.

Figure 2:
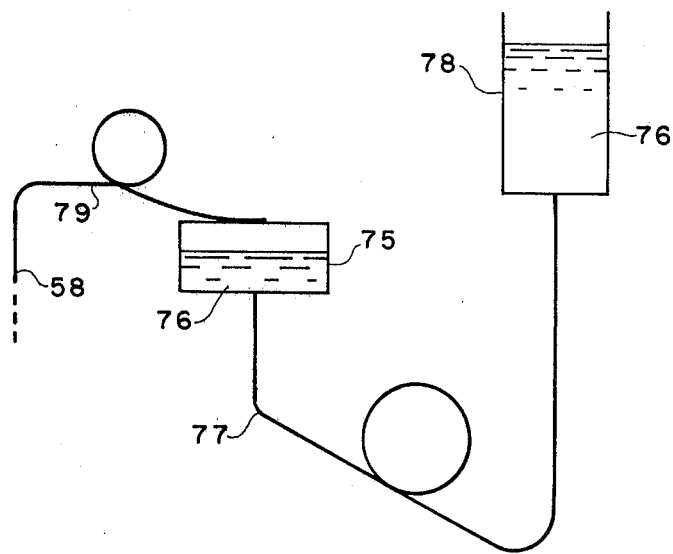

The invention is illustrated, by way of example only, in the accompanying drawings in which:

FIG. 1 is a diagrammatic illustration of an embodiment of a storage installation according to the invention in which the thermal pond has an isothermal zone; and FIG. 2 shows diagrammatically a detail thereof.

The installation according to the invention illustrated in FIG. 1 comprises a pond 1 having side walls 2 (only one of which is shown) and a bottom 3. Bottom 3 is covered by a slurry 4 of solid solute, e.g. $CaCl_2$, which in turn is covered by a body of saturated aqueous solution of the solute that forms the pond. This body comprises a lower, isothermal zone 5, a superimposed insulating zone 6 and an upper, a pressure regulating zone 7. The various zones are delimited by interface 8 between zones 5 and 6 and interface 9 between zones 6 and 7. The surface of the pond is indicated at 10.

By definition the same temperature prevails throughout the isothermal zone 5 and consequently the concentration throughout that zone is also uniform. Against this as the temperature in zone 7 drops continuously between interfaces 8 and 9 there occurs a corresponding drop of the saturation concentration. By definition zone 6 is at each level saturated at the temperature there prevailing and in consequence there is a decrease of concentration between interfaces 8 and 9 corresponding to the decrease of temperature.

The pressure regulating zone 7 is initially at ambient temperature and saturated at that temperature. Depending on the duration of its presence in the pond a new steady state may establish itself in zone 7 in consequence of prolonged contact with zone 6 and with solid solute sinking across zone 7 so that it may acquire similar concentration and temperature characteristics as the upper levels of zone 6.

For heat storage the installation comprises heat input means in form of a heat exchanger-saturator apparatus 11 comprising a cylindrical body 12 the interior of which is divided into a space 13 for the passage of a heat donor fluid and a space 14 for the passage of a heat-acceptor solution. Space 13 comprises upper and lower sections which communicate with each other through a plurality of pipes 15. Openings 16 and 17 serve for inlet and outlet of the heat donor fluid.

The space 14 for the heat-acceptor solution comprises a lower, main section 14a and an upper section 14b, communicating with each other through a pipe 18. Section 14a is fitted with an inlet 19 and outlet 20 for the heat receiver solution. Inlet 19 is linked through a pipe 21 to the delivery end of a pump 22 the intake of which is linked by a pipe 23 to an upper level of zone 6. Outlet 20 is linked through a pipe 24 fitted with a shut-off valve 25 to a manifold 26 from which there extend a plurality of injectors 27 each fitted with a deflector 28.

Section 14a of space 14 comprises an opening 30 linked through a pipe 31 to the bottom region of pond 1 so that the two communicate and the pressure prevailing inside space 14 is approximately equal to the hydrostatic pressure prevailing at the bottom of the pond. Inside section 14a of space 14 there are provided a plurality of grids 32 of which two are shown, each grid supporting some solid solute 33.

Section 14a of space 14 is fitted with openings 34a, 34b fitted respectively with shut-off valves 35a, 35b and linked through pipes 36a, 36b and 37 to the delivery end of a pump 38.

Apparatus 11 is located in a pit such that the level of the liquid surface inside space 14b corresponds approximately to the level of the bottom of pond 1. (This feature is not shown in the unfolded, diagrammatic illustration in FIG. 1).

For heat withdrawal the installation here illustrated comprises a collector manifold 40 with an array of intake pipes 41 each having on its lower side a plurality of openings 42. The manifold 40 is linked through a pipe 43 fitted with a non-return valve 44 to the inlet 45 of a heat extractor means in form of a heat exchanger 46 comprising a central portion 47 and a jacket 48. Jacket 48 is fitted with an inlet 49 and an outlet 50 for a heat-acceptor fluid serving for the withdrawal of heat for consumption from the heat exchanger 46. The lower part of the central portion 47 merges into a sump 51 for the accumulation of solid solute 52 that precipitates upon cooling of the hot solution withdrawn from the pond in consequence of heat transfer to the heat-acceptor fluid. Sump 51 has a lower opening 53 which is linked through a pipe 54 to the intake end of pump 38. A further, upper opening 55 of sump 51 is linked through a pipe 56 to the intake end of a sump 57 the delivery end of which is linked through a pipe 58 to an upper level of zone 6.

A by-pass pipe 59 fitted with a shut-off valve 60 and a non-return valve 61 links section 14b of space 14 in apparatus 11 with pipe 43 and therethrough with the central portion 47 of heat exchanger 46.

A reservoir 64 is linked with zone 7 by a system which comprises pipes 65, 66 fitted, respectively, with shut-off valves 70, 71; pipes 67, 68 fitted respectively, with shut-off valves 72, 73; and a pump 69.

During operation a solution of the solute withdrawn from an upper level of zone 6 via pipe 23 is injected into space 14 by means of pump 22 through pipe 21 and opening 19. The fed-in liquid fills most of the space, creating an air cushion 74 at the top region of section 14b. As the pond is built up the hydrostatic pressure inside the pond rises gradually and with it the pressure prevailing inside apparatus 11, which is due to the communication of the interior of the apparatus with the bottom of the pond through pipe 31. As the pressure rises the air cushion 74 is compressed and in this manner it is ensured that the pressure inside apparatus 11 corresponds at all times to the hydrostatic pressure at the bottom of the pond.

Inside section 14a the solution is heated by indirect heat exchange with a heat donor fluid flowing through space 13 and at the same time some solid solute 33 present on grids 32 is dissolved until saturation. The heated and saturated brine is discharged through opening 20 and pipe 24 into manifold 26 and is injected into pond 1 through injectors 27.

Apparatus 11 thus supplies a brine saturated at the pressures and temperatures prevailing from time to time near the bottom 3 of pond 1. In order to ensure that the brine thus delivered to pond 1 is saturated, it is made to percolate through the layer of solute 4 spread on the bottom 3 and the deflector 28 of each injector prevents the clogging thereof. The body of saturated solution is gradually built up at ever increasing temperatures from, say, 170° C. to the equilibrium temperature. The surface of the pond will dissipate some heat to the atmosphere, mainly by conduction, until a steady state has established itself.

Once the build-up of the pond is completed and equilibrium conditions reached, the apparatus 11 continues to operate as heat exchanger-saturator at constant pressure, which constant pressure is maintained by means of the pressure regulating zone 7 as will be explained below. The solid solute 33 on grids 32 is replenished from time to time by injection of a slurry of solute 52 from sump 51 into section 14a of space 14 by means of pump 38 via pipes 54, 37, 36a, 36b, shut-off valves 35a, 35b and openings 34a, 34b.

During operation, as hot saturated solution is introduced into the bottom region of the pond through injectors 27 the isothermal zone 5 expands and its volume increases. Simultaneously zone 6 shrinks by an amount essentially equal to the expansion of zone 5 which is due to the withdrawal of cool saturated solution therefrom for feeding into heat exchanger-saturator 11.

During heat withdrawal hot solution flows from zone 5 through openings 42, intake pipes 41, manifold 40 and pipe 43 to the central space 47 of heat exchanger 46 and gives off its heat to a heat-acceptor fluid circulating through jacket 48 of the exchanger 46. The heat so withdrawn is supplied to consumers.

In consequence of the heat withdrawal the solution in the central space 47 of exchanger 46 is cooled and some solute crystallizes and collects in form of a slurry 52 in sump 51 from where it is recycled through outlet 53, pipe 54, pump 38 and piping system 37, 36a, 36b, 35a, 35b and the inlets 34a and 34b to the heat exchanger-saturator 11 as specified. The cooled supernatant solution is withdrawn from sump 51 through opening 55, pipe 56, pump 57 and pipe 58 and is recycled to an upper level of zone 6 where the temperature and density are equal to those of the recycled solution.

Because of the precipitation of some solute in heat exchanger 46 the weight of the solution recycled to the upper level of zone 6 through pipe 58 is less than the weight of the solution withdrawn from zone 5 and in consequence the hydrostatic pressure on the bottom 3 is reduced. Such a fluctuation of hydrostatic pressure may have detrimental consequences as explained hereinbefore. This inconvenience is obviated by the provision of the pressure regulating zone 7 on top of the insulating zone 6. Saturated solution at ambient temperature is used for this purpose. This solution is stored in reservoir 64 and when heat withdrawal exceeds heat input which causes a deficiency of solute inside pond 1 solution is transferred from the reservoir to zone 7 of pond 1 by means of pump 69 via pipes 65, 66 and the associated shut-off valves 70, 71 which for such transfer are open while valves 72, 73 are shut. When heat input into zone 5 exceeds heat withdrawl which gradually reconstitutes the solute content of pond 1, valves 70, 71 are shut and valves 72, 73 are opened whereupon the flow is reversed and solution returns from zone 7 of pond 1 to reservoir 64. The four valves are operated by conventional means which may comprise a pressure gauge measuring the pressure near the bottom, for servomotors and the requisite electric switch gear.

Heat input into a thermal pond and heat withdrawal therefrom may be consecutive or simultaneous since generally no causal relation exists between the availability of heat from the heat source and the requirement of heat consumers. In cases in which the heat availability and requirement coincide it is possible to by-pass pond 1 and to feed hot solution emerging from the exchanger-saturator apparatus 11 partly or totally to heat exchanger 46 the balance being supplied to zone 5. For this purpose valves 25 and 60 are adjusted so as to allocate the heated solution in accordance with requirements. The non-return valves 61 and 44 prevent the flow of the hot saturated solution in a wrong direction. This regulating action can be controlled by a thermostat (not shown) placed on the outlet 50 of the hot heat-acceptor fluid.

As shown here the heat exchanger 46 is at the site of pond 1. Alternatively, if desired, hot saturated solution may be conducted from pipe 43 to the site of consumption for heat exchange at the site and the resulting cooled slurry of precipitated solute in a saturated solution is returned from there to the storage pond. In practical terms this means simply that heat exchanger 46 or equivalent heat extractor means is shifted from the site of the pond to the site of consumption, while the mode of operation remains essentially the same.

As mentioned before, a thermal pond for an installation of the kind illustrated in FIG. 1 may be coupled to a steam power plant requiring cooling water for its condenser. In such a case the pond may be utilized for cooling the condenser cooling water and in this way the normal cooling towers may be obviated. To this end the cooling water is flushed across the surface of the saturated solution forming the pressure equalising zone 7 and the resulting additional weight of the cooling zone will preferably be taken into account in the control of the height of the pressure regulating zone 7. In practising this embodiment, certain precaution will as a rule be required. Thus if warm, fresh water delivered by the condenser will be in direct contact with a saturated solution, a diffusion of solute into the condenser cooling the water may occur. Such a contamination may be the cause of corrosion of the condenser and its auxiliary equipment. One way to overcome this problem is to make the condenser out of corrosion resistant material, similar to condensers using sea water as cooling medium. Alternatively, a sheet of transparent plastic may be floated on top of zone 7 thus separating the two liquids.

The warm solution spread on the surface 10 of the pond 1 or on a covering sheet, as the case may be, contributes to a reduction of heat losses to the atmosphere and prevents evaporation of water from surface 10.

In order to ensure that the solution recycled through pipe 58 is introduced at a level of the insulating zone of the pond where the density is the same as that of the recycled solution, a device as illustrated in FIG. 2 may be used. This device comprises a float 75 partly filled with a liquid 76 and communicating through a flexible pipe 77 with a storage container 78 equally containing the liquid 76. Float 75 supports a flexible discharge pipe 79 linked to pipe 58 which latter is shown in FIG. 1. By raising or lowering the container 78 the apparent specific gravity of float 75 is increased or decreased, and in this way the level at which it floats and with it the level of the outlet of discharge pipe 79 is adjustable. Areometers (not shown) are provided on float 75 and inside pipe 58 and the level of container 76 is varied by conventional means so as to make the measurements of both areometers coincide. In this way it is ensured that the solution recycled through pipe 58 is injected into a level where the specific gravity is the same.

In the embodiment here illustrated the cooled solution and the precipitated solute are separated from each other in heat exchanger 46 and the entire amount of solute is withdrawn from sump 51 and charged into the heat exchanger-saturator apparatus 11 from where it is returned in form of a hot, saturated solution into pond 1. If desired, part of the precipitated solute 52 accumulating in sump 51 of heat exchanger 46 may be tapped off and spread in fine particulate form or as a slurry on surface 10 of the pond. Where surface 10 is covered by a plastic sheet in order to prevent contact between saturated solution in the pond and any cooling water flushed across the surface, such sheet may comprise perforated pockets depending therefrom and the tapped off solute may be charged into such pockets from which they will flow out into the pond. Alternatively, an array of perforated pipes may be provided for this purpose underneath the sheet.

From FIG. 1 and the foregoing description relating thereto, the operation of a solar pond according to the invention is easily understood. In such a pond the isothermal zone 5, the pressure regulating zone 7 and all the components 11 through 38 are omitted and zone 6 and bottom 3, 4 receive their heat from the penetrating solar radiation. In order to make up for solid solute that precipitates during a heat withdrawal in heat exchanger 46, recycled particulate solid solute or a slurry is spread onto the surface during heat storage and is allowed to sink onto the bottom of the pond. For that purpose pipe 37 is designed so as to lead to a conventional apparatus for spreading the slurry on surface 10. On its way some of the sinking solute is dissolved and in this way the maintenance of saturation concentration at each level of the pond is ensured.

We claim:

1. An installation for the storage and supply of heat comprising a thermal pond for heat storage holding a body of an aqueous solution of a solute the water solubility of which increases with temperature, the concentration, density and temperature of said solution decreasing towards the top, the improvement by which:
    (a) said body of solution is saturated with said solute at each level at the temperature there prevailing;
    (b) said solute is present permanently in solid form on the bottom of the pond in contact with said body of solution, the amount of such solid solute decreasing by dissolution when heat is stored; and
    (c) heat extractor means are provided for heat transfer from hot solution available at a low-level region of the pond to a heat-acceptor fluid thereby to cool said solution and bring about the precipitation of solute from the so-called solution.

2. An installation according to claim 1, wherein said heat extractor means are located within the thermal pond.

3. An installation according to claim 1, wherein said heat extractor means are located outside the thermal pond, means being provided for the withdrawal of solution from a low-level region of the pond and for returning the withdrawn cooled solution and the precipitated solute to the pond.

4. An installation according to claim 3, wherein means are provided for the control of the level inside the pond at which said withdrawn solution is returned from said heat extractor means.

5. An installation according to claim 1, wherein said heat extractor means are at the site of the pond.

6. An installation according to claim 1, wherein said heat extractor means are at the site of heat consumption.

7. An installation according to claim 3, wherein means are provided for returning said cooled solution and precipitated solute to the pond in form of a slurry.

8. An installation according to claim 3, wherein means are provided for separating said cooled solution and precipitated solute from each other outside the pond and for returning them to the pond separately.

9. An installation according to claim 8, wherein means are provided for the temporary storage of said separated solute outside the pond.

10. An installation according to claim 8, wherein means are provided for spreading at least some of the returned solute on the surface of the pond.

11. An installation according to claim 10, wherein means are provided for tapping off some solute from said heat extractor means.

12. An installation according to claim 1 adapted for the capture of solar radiation and converting it to heat, wherein said body of solution within the thermal pond is sufficiently shallow to enable visible solar radiation to penetrate to the bottom of the pond.

13. An installation according to claim 1 adapted for the storage of heat from a donor fluid, wherein heat input means are provided for heat exchange with said heat donor fluid.

14. An installation according to claim 12 adapted in addition for the storage of heat from a donor fluid, wherein heat input means are provided for heat exchange with said donor fluid.

15. An installation according to claim 13, wherein said heat input means are installed within the pond in a low-level region thereof.

16. An installation according to claim 13, wherein said heat input means are installed outside the pond.

17. An installation according to claim 16, comprising means for the withdrawal of solution from a high level of said body of solution within the pond, heat exchanger means outside the pond for heating said withdrawn solution by heat exchange with a heat-donor fluid, means for saturating the so-heated solution with solute and means for injecting the so-produced hot, saturated feed solution into the bottom region of the pond.

18. An installation according to claim 1 comprising heat extractor means located outside said thermal pond, means for the withdrawal of solution from a low-level region of the pond, means outside the pond for separating said cooled solution and precipitated solute from each other, means for the withdrawal of solution from a high level of said body of solution within the pond, heat exchanger means outside the pond for heating said withdrawn solution by heat exchange with a heat-donor fluid, means for saturating the so-heated withdrawn solution with said separated solute and means for injecting the so-produced hot, saturated feed solution into the bottom region of the pond.

19. An installation according to claim 1 comprising heat extractor means located within said thermal pond, means for the withdrawal of solution from a high level of said body of solution within the pond, heat exchanger means outside the pond for heating said withdrawn solution by heat exchange with a heat-donor fluid, means for withdrawing solid solute from the bottom of the pond, means for saturating the so-heated solution with said withdrawn solute and means for injecting the so-produced hot, saturated feed solution into the bottom region of the pond.

20. An installation according to claim 13, wherein said body of aqueous solution comprises a lower, isothermal zone and an upper insulating zone superimposed thereon (both terms as herein defined), the insulating zone being sufficiently deep so that the hydrostatic pressure at the bottom of the pond is at least the minimum pressure required for reaching an equilibrium temperature (as herein defined) within said isothermal zone.

21. An installation according to claim 13, wherein means are provided for adding to the top of the pond a saturated aqueous solution of solute at ambient temperature when heat withdrawal from the pond exceeds heat input and for withdrawing said solution when heat input exceeds heat withdrawal, the addition and withdrawal of said solution being so controlled that the hydrostatic pressure at the bottom of the pond remains substantially constant.

22. An installation according to claim 13, wherein by-pass means are provided for optional direct communication between said heat input and heat extractor means.

23. An installation according to claim 13 adapted for association with a steam power plant, wherein means are provided for flushing heated condenser coolant across the surface of the pond and returning it after cooling to the condenser.

24. An installation according to claim 23, wherein the surface of the pond is covered by an impermeable sheet to avoid direct contact between the solution in the pond and the condenser coolant.

25. An installation according to claim 24, wherein means are provided underneath said sheet adapted to receive from outside the pond and release into the pond recycled solute.

26. An installation according to claim 1, wherein said solute is $CaCl_2$.

27. A method of heat storage and supply, wherein a thermal pond is set up holding a body of an aqueous solution of a solute whose water solubility increases with temperature, the concentration, density and temperature of said solution decreasing towards the top, said body of solution being saturated with said solute at each level at the temperature there prevailing; said solute is provided in solid form on the bottom of said thermal pond in contact with said body of solution; said thermal pond is exposed to conditions at which the bottom region of said body of solution stores heat whereby some of said solid solute is dissolved; and heat is withdrawn from said bottom region.

28. A method according to claim 27, wherein heat withdrawal is effected by heat exchange within the pond.

29. A method according to claim 27, wherein heat withdrawal is effected by withdrawing hot solution from the bottom region of the pond, subjecting it outside the pond to heat exchange with a heat-acceptor fluid whereby the withdrawn solution is cooled and some solid solute precipitates therefrom, and the so-cooled solution and precipitated solute are returned to the pond.

30. A method according to claim 27 applied to the capture of solar radiation and its conversion to heat.

31. A method according to claim 30, wherein the setting up of said thermal pond comprises nearly filling the pond with a saturated solution of a solute at ambient temperature and injecting into the bottom region of the pond a saturated solution of the same solute at an elevated temperature.

32. A method according to claim 28 applied to the storage of heat from a heat-donor source and comprising provisions for heat exchange between a heat-donor fluid and solution from the pond.

33. A method according to claim 32, wherein said heat exchange occurs within the pond.

34. A method according to claim 32, wherein said heat exchange occurs outside the pond.

35. A method according to claim 34, wherein solution is withdrawn from an upper level of the body of solution in the pond, the withdrawn solution is subjected outside the pond to heat exchange with said heat-donor fluid, the so-heated solution is saturated with solid solute derived from the pond and the so-produced hot, saturated feed solution is injected into the bottom region of the pond.

36. A method according to claim 34, wherein heat withdrawal also occurs outside the pond and the solute required for preparing said feed solution is derived from solute precipitated outside the pond during heat withdrawal.

37. A method according to claim 34, wherein heat withdrawal occurs within the pond and the solute required for preparing said feed solution is withdrawn from the bottom of the pond.

38. A method according to claim 30, serving also for the storage of heat from a heat donor source.

39. A method according to claim 32, wherein a thermal pond is set up which is sufficiently deep to create in the bottom region a hydrostatic pressure sufficiently high to enable heating the solution in the bottom region up to an equilibrium temperature (as herein defined) thereby to form an isothermal zone (as herein defined); a hot saturated aqueous solution of said solute the temperature of which is at least equal to said equilibrium temperature, is prepared outside the pond by withdrawing solution from said insulating zone, subjecting it outside the pond with a heat donor fluid and dissolving in it to saturation solid solute derived from the pond; and said hot, saturated solution is injected into the bottom region of the pond.

40. A method according to claim 34, wherein at least some of the solute precipitated outside the pond during heat withdrawal is spread on the surface of the pond.

41. A method according to claim 33, wherein a saturated aqueous solution of solute at ambient temperature is added at the top of the pond when heat withdrawal from the pond exceeds input and the so-added solution is withdrawn when heat input exceeds withdrawal, the addition and withdrawal of said solution being so controlled that the hydrostatic pressure at the bottom of the pond remains substantially constant.

42. A method according to claim 32, wherein said heat-donor source is a steam power plant and condenser cooling liquid from the plant being selected from the group consisting of water and aqueous solution is cooled by flushing it across the pond surface.

43. A method according to claim 42, wherein said cooling liquid is water and an impermeable sheet is interposed between the pond surface and flushed condenser water.

* * * * *